United States Patent
Nichols et al.

(10) Patent No.: US 8,383,729 B2
(45) Date of Patent: Feb. 26, 2013

(54) RUBBER FILLED ORIENTED POLYMER COMPOSITION ARTICLE

(75) Inventors: Kevin L. Nichols, Freeland, MI (US); Brett M. Birchmeier, Midland, MI (US); Kim L. Walton, Lake Jackson, TX (US)

(73) Assignee: Eovations, LLC, Grand Rapids, MI (US)

( * ) Notice: Subject to any disclaimer, the term of this patent is extended or adjusted under 35 U.S.C. 154(b) by 0 days.

(21) Appl. No.: 13/409,548

(22) Filed: Mar. 1, 2012

(65) Prior Publication Data

US 2012/0277336 A1    Nov. 1, 2012

Related U.S. Application Data

(62) Division of application No. 12/619,191, filed on Nov. 16, 2009, now abandoned.

(60) Provisional application No. 61/117,584, filed on Nov. 25, 2008.

(51) Int. Cl.
- *C08F 8/00* (2006.01)
- *C08L 9/00* (2006.01)
- *C08L 23/04* (2006.01)
- *C08L 23/10* (2006.01)

(52) U.S. Cl. .................. 525/191; 525/232; 525/240

(58) Field of Classification Search ................ 525/191, 525/232, 240

See application file for complete search history.

(56) References Cited

U.S. PATENT DOCUMENTS

| | | | |
|---|---|---|---|
| 3,386,925 A | 6/1968 | Dillhoefer | |
| 4,028,288 A | 6/1977 | Turner | |
| 5,518,055 A | 5/1996 | Teeple et al. | |
| 7,378,464 B2 | 5/2008 | Aoki | |
| 7,687,002 B2 * | 3/2010 | Nichols et al. | 264/323 |
| 2006/0084760 A1 | 4/2006 | Rego et al. | |
| 2008/0111278 A1 | 5/2008 | Nichols et al. | |
| 2009/0001625 A1 | 1/2009 | Newson et al. | |
| 2009/0001629 A1 | 1/2009 | Newson et al. | |
| 2009/0001635 A1 | 1/2009 | Newson et al. | |
| 2009/0155534 A1 | 6/2009 | O'Brien et al. | |

FOREIGN PATENT DOCUMENTS

| | | |
|---|---|---|
| CN | 1281523 | 11/2002 |
| CN | 1381525 | 11/2002 |
| CN | 101039971 A | 9/2007 |
| EP | 649871 A2 | 5/1994 |
| EP | 1127918 | 8/2001 |
| PL | 177682 | 12/1999 |
| WO | 0145915 | 6/2001 |
| WO | 2007016376 | 2/2007 |
| WO | 2008057167 | 5/2008 |

OTHER PUBLICATIONS

A. Pawlak and A. Galeski, Plastic Deformation of Crystalline Polymers: The Role of Cavitation and Crystal Plasticity, Macromolecules, 38(23), pp. 9688-9697 (2005).

Huber, Greor; Sharma, Ashutosh; Brunne, Martin; Additive Approaches to Improve Scratch and Mar Resistance in Automotive PP and TPO, Conference presentation at TPOs in Automotive; Geneva, Jun. 21-22, 2005. Paper reprint available at: http://www.ciba.com/pf/docMDMS.asp?targetlibrary=CHBS_PA_MADS &docnumber=4271.

ICC Evaluation Service, Inc., Acceptance Criteria for Deck Board Span Ratings and Guardrail Systems (Guards and Handrails), International Code Council, ICC-ES, AC174, Copyright 2008, pp. 1-6.

Chinese Office Action for 200980154597.2 issued on Jul. 16, 2012.

* cited by examiner

*Primary Examiner* — Nathan M Nutter
(74) *Attorney, Agent, or Firm* — Dickinson Wright PLLC

(57) ABSTRACT

Including crosslinked rubber particles in an oriented polymer composition induces cavitation in the oriented polymer composition and can increases the scratch and mar resistance as well as fibrillation resistance.

15 Claims, No Drawings

RUBBER FILLED ORIENTED POLYMER COMPOSITION ARTICLE

CROSS REFERENCE STATEMENT

This application is a divisional of U.S. application Ser. No. 12/619,191, filed Nov. 16, 2009 and now abandoned, which claims the benefit of U.S. Provisional Application No. 61/117,584, filed Nov. 25, 2008, which is incorporated herein by reference.

BACKGROUND OF THE INVENTION

1. Field of the Invention

The present invention relates to an oriented polymer composition article comprising crosslinked rubber particles and a process for preparing such an article. A desirable embodiment of the invention relates to an expanded oriented polymer composition article comprising crosslinked rubber particles.

2. Description of Related Art

Oriented polymer composition articles (OPCs) are gaining market share in construction markets previously occupied almost solely by wood materials. For example, a number of different OPC decking materials are now available for use instead of cedar, redwood, treated pine, or other more historically standard decking materials. High strength and low maintenance are but a few of the desirable characteristics of OPCs that are helping them advance in these markets.

Unfortunately, OPCs are susceptible to scratching and marring that is undesirably visible, particularly in dark colored OPCs. OPCs also tend be undesirably susceptible to fibrillation when cut or exposed to abrasion across fibrils proximate to the OPC's surface. These drawbacks reduce the appeal of OPCs for applications such as decking where cutting is necessary and where scratching, abrasion and/or marring is likely to occur.

Methods for improving scratch and mar resistance of polypropylene polymer compositions include applying a protective layer over the polypropylene polymer in the form of a coating or laminate, incorporating slip additives or small hard particulates, or incorporating silicone based additives. (see, for example, Huber, Gregor; et al.; *Additive Approaches to Improve Scratch and mar Resistance in Automotive PP and TPO*, Conference presentation at TPOs in Automotive; Geneva, Jun. 21-22, 2005. Reprints available at: http://ww-w.ciba.com/pf/docMDMS.asp?targetlibrary=CHBS_PA_MADS&docnumber=427 1). Applying a coating on a polypropylene article adds considerable complexity to OPC processing by requiring an application step after fabricating the article. Moreover, selection of the coating material and application method requires careful screening and testing to ensure that the coating adheres to polypropylene because if the coating delaminates from the article the scratch and mar resistance is lost. Incorporation of slip agents and hard particulates have not offered a complete solution to scratch and mar resistance, nor fibrillation as Comparative Examples A and C-E herein reveal.

Fibrillation can be reduced by heat treating an OPC surface (see, U.S. provisional application 61/014,131). This process is effective at reducing fibrillation but is generally less effective at reducing the appearance of scratches and mars on an OPC and can actually accentuate the appearance of subsequent scratches and mars. Moreover, with ever increasing energy prices, it is desirable to avoid having to apply heat to an OPC.

It is desirable to have a process for producing an OPC that is scratch and mar resistant without requiring application of a material onto the OPC. Moreover, it is desirable to be able to reduce fibrillation of an OPC without having to apply heat to a surface of the OPC. Yet more desirable is a cavitated OPC with these properties in order to also benefit from low weight.

BRIEF SUMMARY OF THE INVENTION

Surprisingly, combining crosslinked rubber particles into a polymer composition and then forming the polymer composition into an oriented polymer composition article (OPC) produces an OPC with one or more of the aforementioned desirable characteristics provided the crosslinked rubber particles are "non-flowable" at the softening temperature of the polymer composition. Crosslinked rubber particles are "non-flowable" if a pile of the rubber particles can be placed between platens that are at the softening temperature of the polymer composition of the OPC and then compressed between the platens at a pressure of 13.8 megaPascals (2000 pounds per square inch) for approximately 10 minutes and upon release of the pressure the crosslinked rubber particles remain as separable particles and resume their original shape.

For example, the mere presence of the crosslinked rubber particles in the polymer composition induces cavitation during solid state die drawing of the polymer composition. Therefore, solid state die drawing a polymer composition comprising crosslinked rubber particles that are non-flowable at the softening temperature of the polymer composition produces an expanded OPC (EOPC) which is particularly desirable due to both its increased strength and modulus and reduced density due to cavitation when compared to the non-oriented polymer composition.

More surprising, when the crosslinked rubber particles are present the resulting OPC demonstrates an improved scratch and mar resistance over a similar OPC that does not contain crosslinked rubber particles. Moreover, solid state die drawing of the polymer composition results in an EOPC with improved scratch and mar resistance over a similar EOPC without crosslinked rubber particles.

Even more surprising, when the crosslinked rubber particles are present at a concentration of about 25 wt % or more based on the polymer composition weight the resulting OPC demonstrates an inherently improved scratch and mar resistance and an inherently improved resistance to fibrillation. Die drawing the polymer composition can further induce cavitation to produce an EOPC with these enhanced properties.

In a first aspect, the present invention is an oriented polymer composition article comprising a polymer composition that has a softening temperature, crosslinked rubber particles dispersed within the polymer composition, and a continuous orientable polymer phase in the polymer composition; wherein the crosslinked rubber particles have a viscosity that is at least ten times that of the polymer composition at the softening point of the polymer composition.

Particularly desirable embodiments of the first aspect include any one or combination of more than one of the following characteristics: the oriented polymer composition contains void volume sufficient to reduce its density 5 percent or more; void cavities exist within the polymer composition proximate to crosslinked rubber particles; the crosslinked rubber particles contain at least one additive selected from silica and carbon black; the crosslinked rubber particles are ground up tires; the crosslinked rubber particles are present at a concentration of 50 weight-percent or less based on polymer composition weight; the concentration of crosslinked rubber particles is ten weight-percent or more and 40 weight-percent or less based on polymer composition weight; the concentration of crosslinked rubber particles is 25 weight-percent or more and 40 weight-percent or less based on polymer composition weight; the rubber particles have a particle size in a range of 10 to 200 mesh; the concentration of rubber particles is 10 wt % or more and 50% or less and the rubber particles have a particle size of 100 microns or more and 2000 microns or less; the concentration of rubber particles is 25 wt % or more and 40% or less and the rubber particles have a particle size of 180 microns or more and 600 microns or less; the continuous orientable polymer phase comprises 80 percent or more by weight propylene-based polymers; and the OPC has a flexural modulus of greater than 1.4, preferably greater than 2.1 gigaPascals.

In a second aspect, the present invention is a process for preparing the oriented polymer composition article of the first aspect, the process comprising the following steps: (a) providing a polymer composition that has a softening temperature, a continuous orientable polymer phase and crosslinked rubber particles dispersed within the polymer composition; and (b) conditioning the polymer composition to a drawing temperature that is below the softening temperature of the polymer composition; and (c) drawing the polymer composition while initially at the drawing temperature and thereby inducing orientation of polymer chains in the polymer composition to form an oriented polymer composition; wherein the crosslinked rubber particles have a viscosity that is at least ten times higher than that of the polymer composition at the softening temperature of the polymer composition.

Particular embodiments of the second aspect include any one or combination of more than one of the following characteristics: step (c) includes drawing the polymer composition through a solid state drawing die and inducing cavitation within the polymer composition; the crosslinked rubber particles contain silica; the crosslinked rubber particles are ground up tires; the concentration of crosslinked rubber particles is ten weight-percent or more and 40 weight-percent or less based on polymer composition weight; the concentration of crosslinked rubber particles is 25 weight-percent or more and 40 weight-percent or less based on polymer composition weight; the rubber particles have a particle size in a range of 10 to 200 mesh; the concentration of rubber particles is 20 wt % or more and 50% or less and the rubber particles have a particle size of 100 microns or more and 2000 microns or less; the concentration of rubber particles is 25 wt % or more and 40% or less and the rubber particles have a particle size of 180 microns or more and 600 microns or less; the continuous orientable polymer phase comprises 80 percent or more by weight propylene-based polymers; and further comprising step (d) of cooling the oriented polymer composition.

The process of the present invention is useful for preparing OPCs of the present invention. OPCs of the present invention can be cavitated, can inherently possess scratch and mar resistance, can inherently possess resistance to fibrillation, or any combination of these desirable properties. As a result, OPCs of the present invention are particularly useful in applications where appearance is important and exposure to abrasion is high. For example, OPCs of the present invention are useful for decking materials as well as any other application typically satisfied with a wood product.

DETAILED DESCRIPTION OF THE INVENTION

Terms

"Polymer composition" comprises a continuous polymer phase containing at least one polymer component and can contain non-polymeric components. A "filled" polymer composition includes discontinuous additives, such as inorganic fillers and/or crosslinked rubber particles, in the polymer composition.

An "orientable polymer" is a polymer that can undergo induced molecular orientation by solid state deformation (for example, solid state drawing). An orientable polymer can be amorphous or semi-crystalline (semi-crystalline polymers have a melt temperature ($T_m$) and include those polymers known as "crystalline"). Desirable orientable polymers include semi-crystalline polymers, even more desirable are linear polymers (polymers in which chain branching occurs in less than 1 of 1,000 polymer units). Semi-crystalline polymers are particularly desirable because they result in greater increase in strength and modulus than amorphous polymer compositions. Semi-crystalline polymer compositions can result in 4-10 times greater increase in strength and flexural modulus upon orientation over amorphous polymer compositions.

"Oriented polymer composition article", "OPC" and "oriented polymer composition" are interchangeable and refer to an article made by orienting the polymers of a polymer composition.

"Fibrillation" is the separation of fibers of a material from a bulk material. Fibrillation further encompasses "delamination", which refers generally to separation from a bulk material of cross sectional lengths that are wider than fine fibers. For clarity herein, "fibrillation" refers to both fibrillation of fine strands and wide strands and includes delamination.

An "orientable polymer phase" is a polymer phase that can undergo induced molecular orientation by solid state deformation (for example, solid state drawing). Typically, 75 weight-percent (wt %) or more, even 90 wt % or more or 95 wt % or more of the polymers in the orientable polymer phase are orientable polymers based on total orientable polymer phase weight. All of the polymers in an orientable polymer phase can be orientable polymers. An orientable polymer phase may comprise one or more than one type of polymer and one or more than one type of orientable polymer.

"Weight-percent" and "wt %" are interchangeable and are relative to total polymer weight unless otherwise stated.

"Solid state" refers to a polymer (or polymer composition) that is at a temperature below the softening temperature of the polymer (or polymer composition). Hence, "solid state drawing" refers to drawing a polymer or polymer composition that is at a temperature below the softening temperature of the polymer (or polymer composition).

"Cross sections" of an OPC are perpendicular to the orientation direction of the OPC unless the reference to the cross section indicates otherwise. A cross section has a centroid, a perimeter and dimensions that extend through the centroid and connect two points on the perimeter.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. Determine $T_m$ using a heating rate of 10 degrees Celsius (° C.) per minute. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

$T_s$ for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in ASTM method E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the lowest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous, then the softening temperature of the combination is the lower softening temperature of the two phases.

In the present case where the present invention where the polymer composition includes crosslinked rubber particles dispersed in a continuous polymer phase, the softening temperature of the polymer composition is the softening temperature of the continuous polymer phase.

"Drawing temperature" is a temperature within a drawing temperature range at which a polymer is conditioned prior to drawing and is the temperature at which the polymer exists upon the initiation of drawing.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points in the cross sectional dimension.

"Polypropylene xylene solubles" is interchangeable with "PP xylene solubles", and "PPXS". PPXS are components that are soluble in xylene and that contain polymerized propylene units. For the present invention, PPXS primarily refers to atactic polypropylene, stereoblock polypropylene (molecules of isotactic containing stereodefects containing segmented isotactic portions of polypropylene to a degree that the molecule is soluble in xylene under PPXS measurement conditions), low weight-averaged molecular weight polypropylene including isotactic polypropylene and oligomers of propylene.

"Ethylene/propylene copolymer xylene solubles" is interchangeable with "E/P-XS". E/P-XS are components that are soluble in xylene and that contain both ethylene and propylene units polymerized into the component. E/P-XS copolymers include oligomers. "Inherently", as in an OPC inherently possesses a property or characteristic, means that the article (for example, the OPC) possesses the property or characteristic directly upon creation and does not require subsequent modifications such as lamination, coating, and/or surface heat treatments.

"Particle size" refers to the size where a majority (greater than 50 wt % of the particles, preferably greater than 75 wt %, more desirably 100 wt %) of the particles in the OPC are of that size or larger. One desirable method of determine and characterizing particle size for rubber particles is by using sieves and openings according to U.S. Standard Sieve values.

An OPC is "similar" to another OPC if its composition is substantially the same as the other OPC in all respect except those noted in the context where the similar OPC is references. Compositions are substantially the same if they are the same within reasonable ranges of process reproducibility.

"ASTM" refers to an American Society for Testing and Materials test method. The year of the method is either designated by a hyphenated suffix in the method number or, in the absence of such a designation, is the most current year prior to the filing date of this application.

"Multiple" means at least two.

"And/or" means "and, or as an alternative."

Ranges include endpoints unless otherwise stated.

Process and Composition

The process of the present invention requires providing a polymer composition that has a softening temperature. The polymer composition includes both a continuous orientable polymer phase and crosslinked rubber particles dispersed within the polymer composition. The OPC of the present invention comprises a similar polymer composition having a softening temperature, crosslinked rubber particles dispersed within the polymer composition and a continuous orientable polymer phase only the polymer composition is oriented more in the OPC than that which is provided in the first step of the process. The following description of the polymer composition, crosslinked rubber particles and orientable polymer phase applies to both the process and OPC of the present invention.

Crosslinked rubber particles are distinct from non-crosslinked rubber and non-crosslinked rubber particles. Crosslinked rubber particles have chemical bonds ("crosslinks") between polymer chains making up the rubber. Crosslinked rubber particles remain intact and separable from one another at temperatures greater than suitable drawing temperatures for the present invention. In contrast, non-crosslinked rubber is a thermoplastic that deforms readily at temperatures below drawing temperatures of the present invention. Therefore, non-crosslinked rubber flows and dissipates in a polymer composition during solid state drawing of the polymer composition. In contrast, crosslinked rubber particles remain intact and separable from one another within a polymer composition during solid state drawing of the polymer composition.

The crosslinked rubber particles in an OPC of the present invention comprising the crosslinked rubber particles and polymer composition are characterized by being "non-flowable" at the softening temperature of the polymer composition (that is, the softening temperature of the continuous polymer phase in which the crosslinked rubber particles reside). Crosslinked rubber particles are "non-flowable" if a pile of the rubber particles can be placed between platens that are at the softening temperature of the polymer composition of the OPC and then compressed between the platens at a pressure of 13.8 megaPascals (2000 pounds per square inch) for approximately 10 minutes and upon release of the pressure the crosslinked rubber particles remain as individual particles and resume their original shape.

The rubber in the crosslinked rubber particles can be natural rubber, synthetic rubber or a combination of natural and synthetic rubbers. Crosslinking can be by any one or combination of more than one crosslinking means including reaction with multifunctional monomer during a polymerization process or by reaction with a crosslinking agent after polymerization. Vulcanization with sulfur is a common acceptable method of crosslinking rubber. The crosslinked rubber particles can contain elements other than crosslinked rubber. In one desirable embodiment the crosslinked rubber particles are ground up portions of tires (for example, automobile tires, truck tires, and/or tractor tires) and can include any or all of the components found in tires. Silica has been included in tires to enhance wear characteristics of the tires (see, for example, U.S. Pat. No. 5,518,055 at column 2 line 64-column 3 line 6 and U.S. Pat. No. 7,378,464 at column 5 lines 17-27). Tires can also include carbon black particles that serve as a reinforcing filler that imparts abrasion resistance. The crosslinked rubber particles of the present invention may also contain silica, carbon black particles, both silica and carbon black particles or can be free of silica, carbon black particles or both silica and carbon black particles. Moreover, the polymer composition may contain silica particles that are separate from the crosslinked rubber particles or may be free of silica particles that are separate from the crosslinked rubber particles.

The crosslinked rubber particles tend to affect at least two properties of an OPC. First, increasing rubber particle size tends to increase efficiency in increasing resistance to fibrillation up to a certain particle size. That is, resistance to fibrillation increases more dramatically with rubber particle concentration when the rubber particles are larger. Without being bound by theory, larger rubber particles are believed to interrupt entanglement of polymer chains that may otherwise form fibers in the OPC's orientation direction during the drawing process. As rubber particles increase in size it is believed to be less likely that polymer chains can entangle around the rubber particles in order to extend a fiber beyond the rubber particle. Therefore, it is believed that fibers have a greater tendency to terminate at larger rubber particles than smaller particles. In order to optimize resistance to fibrillation it is desirable to use crosslinked rubber particles that are 100 microns or larger, preferably 600 microns or larger. The rubber particles typically are 2000 microns or less. When the crosslinked rubber particle sizes are greater than 2000 microns the OPC boards have a tendency to fracture during drawing.

Rubber particle size can also affect the surface smoothness of the resulting OPC, with smaller particle sizes tending to result in smoother surfaces. The crosslinked rubber particles all desirably have a particle size of 2000 microns or less, preferably 710 microns or less, an more preferably 425 microns or less and can be 75 microns or less. Smaller particle sizes are desirable in order to optimize surface smoothness of a resulting OPC. If the rubber particles are much bigger than 2000 microns they tend to become apparent on surfaces of the OPC as bumps or rough features. The cost of crosslinked rubber particles tend to increase as the particle size decreases, as does the amount of rubber particles necessary in an OPC to optimize delamination strength (resistance to fibrillation). Therefore, to be economically practical, the rubber particles are typically 75 microns or larger in size.

The polymer composition desirably, though not necessarily, contains crosslinked rubber particles at a concentration of 50 wt % or less based on total polymer composition weight. When the crosslinked rubber particle concentration exceeds 50 wt % of a polymer composition the polymer composition becomes difficult to draw into an OPC. In general, there is no lower limit on the concentration of crosslinked rubber particles in the polymer composition. The mere presence of the crosslinked rubber particles, particularly when present at a concentration of one wt % or more, induces desirable cavitation during solid state drawing and reduces or eliminates appearance of scratches. A desirable embodiment of the present invention includes rubber particles at a concentration of one wt % or more based on polymer composition weight in order to achieve the surprising result of improved scratch and mar resistance inherently in an OPC made from the polymer composition. Another desirable embodiment of the present invention include rubber particles at a concentration of 25 wt % or more based on polymer composition weight in order to achieve the surprising result of achieving inherently improved scratch and mar resistance as well as an unexpected and a desirable and inherent reduction in fibrillation of an OPC made from the polymer composition.

In order to simultaneously balance OPC resistance to fibrillation, surface smoothness and scratch resistance in an optimal manner the OPC desirably has a rubber particle concentration of 20 wt % or more, preferably 25 wt % or more and 50 wt % or less, preferably 40 wt % or less and a rubber particle size of 100 microns or more, preferably 180 microns or more and 2000 microns or less, preferably 600 microns or less.

The polymer composition of the present invention comprises a continuous orientable polymer phase. The continuous orientable polymer phase is an orientable polymer phase that is continuous within the polymer composition. Generally, the orientable polymer phase comprises all non-crosslinked polymers in the polymer composition and typically all orientable polymers in the polymer composition. The continuous orientable polymer phase can comprise more than one type of polymer, including more than one type of orientable polymer. The orientable polymer phase can consist of one or more than one type of orientable polymer.

Orientable polymers can be amorphous or semi-crystalline. Herein, "semi-crystalline" and "crystalline" polymers interchangeably refer to polymers having a melt temperature ($T_m$). Desirable orientable polymers are one or more than one semi-crystalline polymer, particularly polyolefin polymers (polyolefins). Polyolefins tend to readily undergo cavitation in combination with filler particles presumably because polyolefins are relatively non-polar and as such adhere less readily to filler particles. Linear polymers (that is, polymers in which chain branching occurs in less than 1 of 1,000 monomer units such as linear low density polyethylene) are even more desirable.

Suitable orientable polymers include polymers and copolymers based on polystyrene, polycarbonate, polypropylene, polyethylene (for example, high density, very high density and ultra high density polyethylene), polyvinyl chloride, polymethylpentane, polytetrafluoroethylene, polyamides, polyesters (for example, polyethylene terephthalate) and polyester-based polymers, polycarbonates, polyethylene oxide, polyoxymethylene, polyvinylidine fluoride and liquid crystal polymers and combinations thereof. A first polymer is "based on" a second polymer if the first polymer comprises the second polymer. For example, a block copolymer is based on the polymers comprising the blocks. Particularly desirably orientable polymers include polymers based on polyethylene, polypropylene, and polyesters. More particularly desirable orientable polymers include linear polyethylene having a Mw from 50,000 to 3,000,000 g/mol; especially from 100,000 to 1,500,000 g/mol, even from 750,000 to 1,500,000 g/mol.

A preferred class of polyesters (and polyester-based polymers) is those which are derivable from the reaction of at least one polyhydric alcohol, suitably a linear polyhydric alcohol, preferably a diol such as linear $C_2$ to $C_6$ diol with at least one polybasic acid, suitably a polycarboxylic acid. Examples of suitable polyesters include polyethylene 2,6-naphthalate, polyethylene 1,5-naphthalate, polytetramethylene 1,2-dihydroxybenzoate, polyethylene terephthalate, polybutylene terephthalate and copolyesters, especially of ethylene terphthalate.

Polypropylene (PP)-based polymers (that is, polymers based on PP) are one example of desirable orientable polymers for use in the present invention. PP-based polymers generally have a lower density than other orientable polyolefin polymers. Therefore, PP-based polymers facilitate lighter articles than other orientable polyolefin polymers. PP-based polymers also offer greater thermal stability than other orientable polyolefin polymers. Therefore, PP-based polymers may also form oriented articles having higher thermal stability than oriented articles of other polyolefin polymers.

Suitable PP-based polymers include Zeigler Natta, metallocene and post-metallocene polypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer composition of 50 to 97 percent by weight (wt %) based on impact copolymer weight and with ethylene propylene copolymer rubber present at 3 to 50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer composition for 50 to 97 wt % of the impact copolymer weight and with ethylene-propylene copolymer rubber present at 3 to 50 wt % of the impact copolymer weight added via compounding, or other rubber (impact modifier) prepared by copolymerization of two or more alpha olefins (such as ethylene-octene) by Zeigler-Natta, metallocene, or single-site catalysis, added via compounding such as but not limited to a twin screw extrusion process. It is desirable to use a PP-based polymer that has a melt flow rate of 0.8 to 8, preferably 2 to 4, more preferably 2 to 3.

In one desirable orientable polymer comprises or consists of a highly crystalline PP-based polymer ("HCPP"). HCPP is a polypropylene-based polymer ("polypropylene") having 4.0 wt % or less, preferably 3.5 wt % or less, more preferably 3.0 wt % or less, still more preferably 2.0 wt % or less, even more preferably 1.0 wt % or less, yet more preferably 0.5 wt % or less and most preferably zero percent of a combination of polypropylene xylene solubles and ethylene/propylene copolymer xylene solubles based on total HCPP weight. Determine percent PPXS and E/P-XS according to ASTM method D5492-06 but only consider components that qualify as PPXS and E/P-XS in determining the percent PPXS and E/P-XS. In other words, do not include in percent PPXS and E/P-XS any contribution by xylene soluble components that are not polymers or oligomers of propylene or ethylene/propylene copolymers. HCPP is also identifiable by isotactic index. The percentage by weight of the polymer insoluble in xylene is the polymer's isotactic index (that is, isotactic index=100%−(wt % of PPXS and E/P-XS)).

PP can be ultra-violet (UV) stabilized, and desirably can also be impact modified. Particularly desirable PP is stabilized with organic stabilizers. The PP can be free of titanium dioxide pigment to achieve UV stabilization thereby allowing use of less pigments to achieve any of a full spectrum of colors. A combination of low molecular weight and high molecular weight hindered amine-type light stabilizers (HALS) are desirable additives to impart UV stabilization to PP. Suitable examples of commercially available stabilizers include IRGASTAB™ FS 811, IRGASTAB™ FS 812 (IRGASTAB is a trademark of Ciba Specialty Chemicals Corporation). A particularly desirable stabilizer system contains a combination of IRGASTAB™ FS 301, TINUVIN™ 123 and CHIMASSORB™ 119. (TINUVIN and CHIMASSORB are trademarks of Ciba Specialty Chemicals Corporation).

In a desirable embodiment, the orientable polymer phase comprises 80 wt % or more, preferably 90 wt % or more PP-based polymers relative to orientable polymer phase weight. The PP-based polymer can be propylene homopolymer.

The polymer composition can further comprise fillers such as organic fillers, inorganic fillers or a combination of organic and inorganic fillers. Organic fillers include cellulosic materials such as wood fiber, wood powder and wood flour. Inorganic fillers include talc, clay (for example, kaolin), magnesium hydroxides, aluminum hydroxides, dolomite, glass beads, silica, mica, metal fillers, feldspar, Wollastonite, glass fibers, metal fibers, boron fibers, carbon black, nano-fillers, calcium carbonate, and fly ash, as well as any combination of one or more of these inorganic fillers.

In the process of the present invention, condition the polymer composition to a drawing temperature ($T_d$) that is below the softening temperature ($T_s$) of the polymer composition. Desirably, $T_d$ is ten degrees Celsius (° C.) or more below the polymer composition $T_s$. $T_d$ can be 15° C. or more, 20° C. or more, 30° C. or more, even 40° C. or more below the polymer composition $T_s$. Lower drawing temperatures are desirable to achieve maximum cavitation in the polymer composition during drawing. Cavitation is desirable to lower the density of the polymer composition to create a relatively low density OPC. Generally, $T_d$ is 40° C. or less below the polymer composition $T_s$. Drawing a polymer composition at a $T_d$ more than 40° C. below $T_s$ requires slower draw rates than is economically desirable in order to avoid fracturing.

Draw the polymer composition while initially at $T_d$ and thereby inducing orientation of the polymer chains in the polymer composition to form an OPC. Ideally, the polymer composition remains at or near (within 10° C.) of $T_d$ during the drawing process in order to maximize orientation and cavitation.

Drawing requires applying a tensile force. Draw a polymer composition by applying a tensile force to the polymer composition to cause the polymer composition to neck and elongate. Drawing processes are distinct from ram extrusion processes, which apply a compressive force behind a polymer composition to force the polymer composition through a die. Tensile force is necessary to achieve cavitation. Therefore, while ram extrusion processes can induce orientation in a polymer composition, such ram extrusion processes are unable to induce cavitation in the polymer composition (apart from an accompanying drawing process step). In contrast, drawing processes both orient a polymer composition and can produce cavitation in the polymer composition.

Drawing can occur by free drawing, by die drawing or by a combination of die drawing and free drawing. In a free draw process a polymer composition is drawn and thus necks apart from any physical constraint. Free drawing offers little control over the final polymer composition size and shape after drawing other than by controlling the polymer composition shape prior to drawing. Typically, free drawing a polymer composition produces an OPC that has a cross sectional shape similar to the polymer composition cross sectional shape prior to drawing. In contrast, a die drawing process includes drawing a polymer composition through a solid state drawing die that directs necking of the polymer composition. Solid state drawing dies are converging dies, meaning they have a drawing channel through which a polymer composition is drawn that reduces in one or more dimension as the polymer composition travel through the die. The shape of the drawing channel helps direct control the necking of the polymer composition as it travel through the drawing channel. Drawing dies offer greater control in defining the shape of an OPC relative to a free drawing process. Often, a polymer composition continues to neck after it exits a solid state drawing die. As a result, a die drawing process often is in combination with at least some free drawing. The amount of free drawing can be controlled by quenching the OPC upon exiting the drawing die. Location and temperature of the quench controls the amount of free drawing the occurs. Quenching sooner after the die and with cooler quenching media lessens the amount of free drawing.

The present process can employ any drawing die and is not limited to a specific drawing die. However, the present invention advantageously employs a substantially proportional drawing die. A substantially proportional drawing die directs drawing of a polymer composition in such a manner so as to achieve an OPC having a cross sectional shape proportional to that of the polymer composition entering the proportional drawing die. Such a die balances polymer forces directed towards a polymer composition cross section centroid such that variations in polymer composition or processing conditions do not affect the shape of the final OPC. Therefore, such a drawing die advantageously provides predictable control over the final OPC shape despite changes in polymer composition or drawing process conditions.

Drawing occurs at a drawing rate. Drawing rate is a measure of linear distance the polymer composition travels over time during the drawing process. Generally, the more a polymer composition necks, cavitates or converges during a drawing process, the faster the drawing rate becomes. It is general practice to define as the drawing rate for an entire drawing process the fastest linear rate the polymer composition experiences during the entire drawing process, which is typically the rate at which the final OPC is manufactured. This is the convention used herein unless otherwise stated.

One of ordinary skill in the art understands that a polymer composition may experience multiple local or intermediate drawing rates during an entire drawing process. For example, a polymer composition may have one drawing rate after a drawing die and yet increase drawing rate by free-drawing after the drawing die. Similarly, the drawing rate of a polymer composition increases as it necks during free-drawing or die-drawing. These processes can be construed as having variable drawing rates. Moreover, drawing can occur in multiple steps; thereby, experiencing multiple intermediate drawing rates. For example, using two different drawing dies in sequence will produce at least two different intermediate drawing rates, with the drawing rate after the second drawing die being faster than the drawing rate after the first die. All conceivable combinations and variations of drawing are within the scope of the present invention. One of ordinary skill in the art recognizes that an overall drawing process may include multiple intermediate drawing steps, each of which may have an intermediate drawing rate that corresponds to the fastest linear rate the orientable polymer composition travels during that intermediate drawing step. Intermediate drawing rates are equal to or less than the drawing rate for the entire process.

One desirable embodiment of the present invention is a solid state die-drawing process that uses a drawing rate of 0.25 meter per minute (m/min) or faster, preferably 0.5 m/min or faster, still more preferably two m/min or faster drawing rate. Optimally, the drawing rate is 1.2 m/min or faster, preferably 2.4 m/min or faster and still more preferably 3.7 m/min or faster. An upper limit for drawing rate of a orientable polymer composition conditioned to $T_d$ is limited only by the force necessary to achieve that drawing rate. The drawing force should not exceed the tensile strength at the drawing temperature of the polymer composition being drawn otherwise the polymer composition will fracture. Typically, the drawing rate is 30 m/min or slower.

The polymer composition can undergo cavitation during the drawing process and thereby decrease in density. Cavitation is a process by which void volume forms proximate to filler particles in a polymer composition as polymer pulls away from filler particles during a drawing process. Cavitation is a means of producing an OPC having void volume without having to use a blowing agent. The extent of cavitation that occurs during drawing is dependent upon drawing rate (up to a certain rate; see, for example, United States patent application 20080111278) as well as the concentration of crosslinked rubber particles, other fillers and crystallites. Increasing any of drawing rate (up to a certain rate), crosslinked rubber concentration, filler concentration or crystallite concentration or decreasing drawing temperature generally increases the extent of cavitation. A desirable embodiment of the process of the present invention induces cavitation during the drawing step to produce an OPC of the present invention that has cavitation void volume (that is, a cavitated OPC). It is known that unfilled polypropylene can cavitate during solid state drawing enough to reduce its density by up to 5 percent. The present process can induce cavitation sufficient to reduce the density of a polymer composition by more than 5%, typically 8% or more, 10% or more, 15% or more even 20% or more.

The process of the present invention may include a cooling step after forming the OPC. Generally, an OPC is at a temperature higher than ambient immediately upon drawing. Therefore, a cooling step can occur after drawing. The cooling step may be to allow the OPC simply to cool to ambient temperature on its own or to employ an affirmative cooling means such as application of water, air or other cooling medium to the OPC. Application of a cooling means is useful to help control the dimensions of the final OPC.

The process of the present invention prepares an OPC of the present invention. Desirably, the OPC of the present invention contains voids that reduce the OPC density relative to the polymer composition density. More desirably, all of the voids are the result of cavitation of the polymer composition during the drawing step. Voids resulting from cavitation are distinguishable from voids resulting from other means because cavitation voids are proximate to crosslinked rubber particles or other fillers.

OPCs of the present invention desirably have a flexural modulus of 1.4 gigaPascals (GPa) (200,000 pounds per square inch (psi)) or greater, preferably 2.1 GPa (300,000 psi) or greater, more preferably 2.8 GPa (400,000 psi) or greater. A flexural modulus of 1.4 GPa or more is desirable to meet deck board code requirements requiring a board stiffness sufficient that the board demonstrates less than 0.09 inches deflection with 100 pounds per square foot weight evenly distributed over a 16 inch span. (see, for example, *International Code Council-Evaluation Services (ICC-ES) requirement AC174* entitled: *Acceptance Criteria for Deck Board Ratings* and Guardrail Systems). Increasing flexural modulus is desirable to achieve even greater board stiffness in order to safely support further weight than the code requires. Measure flexural modulus according to ASTM method D-790-03.

Desirably, OPCs of the present invention have a density of less than 1.0 gram per cubic centimeter (g/cc) and preferably has a density of 0.9 g/cc or less, more preferably 0.8 g/cc or less. Measure density according to ASTM method D-792-00.

OPCs of the present invention surprisingly exhibit increased resistance to, even elimination of visual scratching and marring when they comprise 10 wt % or more crosslinked rubber particles relative to polymer composition weight. Drawn OPCs of the present invention that contain 10 wt % or more crosslinked rubber particles relative to polymer composition weight benefit from being cavitated as well as increased resistance to and even elimination of visual scratching and marring. Evaluate scratch and mar resistance using the Scratch Test Method defined below.

An additional surprising result of the present invention is that when the crosslinked rubber concentration is greater than 25 wt % based on polymer composition weight the OPC exhibits a reduction in fibrillation. An OPC comprises polymer molecules aligned in an orientation direction. Drawing a polymer composition aligns polymer molecules in the polymer composition along an orientation direction, which is parallel to the direction drawing occurs (drawing direction). As orientation occurs, the likelihood of fibrillation (fibrous delamination) parallel to the orientation direction increases since oriented polymers begin resembling fibrils within the OPC. Fibrillation is undesirable and can be manifest in numerous ways. For example, cutting an OPC in a direction non-parallel to its orientation direction can cause fibrillation along the cut edge. Pulling the resulting fibers can undesirably result in delamination, which is evident by peeling a fiber, or even more undesirably, a piece of the OPC away from the OPC along the orientation direction of the OPC. Fibrillation of an OPC is undesirable in products such as deck boards, siding, or any other wood-replacement application where cutting is likely necessary and wearability and integrity of the OPC is desirable. OPCs of the present invention that comprise 25 wt % or more crosslinked rubber benefit from an increased resistance to fibrillation as well as benefit from cavitation and scratch and mar resistance associated with the presence of the crosslinked rubber.

Characterize an OPC's scratch resistance using the following Scratch Resistance Test Method and the OPC's resistance to fibrillation using the following Fibrillation Test Method.

Scratch Test Method

Cut an OPC sample to a length of 23 cm in the draw direction. Using five finger scratch test equipment, draw a single finger stylus, with a 0.3 mm tip that tapers to a point at a 45° angle, along the sample in the drawing direction (direction of polymer orientation). Apply a normal force of 7 Newtons to the stylus tip and draw the stylus at a rate of 177 mm/minute for a distance of 149.45 mm when drawing the stylus along the OPC sample. Circle the area where the stylus traveled using a permanent marker so that this area can be easily located during visual examination. Hold the sample at 0.3 meters from eyes under bright sunlight and completely rotate to determine if a scratch is visible or not. Repeat test on a minimum of three samples of each material to assure results are correct. Report whether a scratch is visible or not.

Fibrillation Test Method

This test method requires cutting into an OPC sample in a direction parallel to the orientation direction of the sample to create a tab and then pulling the tab at a controlled rate and direction until the tab separates from the OPC. The length of the portion of tab and OPC that separates with the tab characterizes the resistance to fibrillation of the OPC. Longer lengths correspond to lower resistance to fibrillation.

Prepare a test sample from a portion of an OPC having dimension of 2.54 cm wide by 0.762 cm thick by 20.32 cm long. Length extends in the extrusion direction. On one end of the OPC and centered on the 2.54 cm wide surface cut a tab having dimensions of 0.635 cm wide by 0.476 cm deep (into the 2.54 cm wide surface) and 0.953 cm long. Place the OPC into a frame that holds the sample at a 45° angle relative to the grip of an MTS-Renew Upgrade package model 5567 tensile testing machine. The frame is mobile and moves in a manner that causes the tab to pull away from the sample directly below the pulling grip. Grasp the tab with the grip and pull the tab away from the OPC sample at a rate of 2.54 centimeters per minute until the tab breaks away from the OPC sample. That is, pull the tab along a y-axis with the OPC sample at a 45° angle between the y and x axes. Measure the length of the tab that separates from the OPC sample. Average the tab length from six samples to obtain a tab length representing the OPC's resistance to fibrillation.

EXAMPLES

The following examples illustrate embodiments of the present invention and not necessarily the full scope of the present invention. Characterize the following Examples and Comparative Examples after drawing without any further heat treatment or coating of their surfaces. Crosslinked rubber particle sizes are converted from US Standard mesh values for the particles as provided by the crosslinked rubber particle supplier.

Comparative Example A

Die draw a polymer composition consisting of nucleated polypropylene-ethylene random copolymer having 0.5 weight-percent (wt %) ethylene component and a melt flow rate of three (for example, INSPIRE™ D404.1 resin, INSPIRE is a trademark of The Dow Chemical Company). Provide the polymer composition in the form of a billet having cross sectional dimensions of 5.08 cm by 1.52 cm and draw at a drawing temperature ($T_d$) 15° C. below the softening point of the polymer composition ($T_d$ is approximately 148° C.) through a substantially proportional solid state drawing die having rectangular cross sectional entrance dimensions greater than that of the billet and exit dimensions of 3.49 cm by 1.046 cm at a drawing rate of 5.7 meters per minute. A substantially proportional solid state drawing die has a shaping channel through which the polymer composition is drawn and every cross section of the shaping channel is substantially proportional to any other cross section of the shaping channel. See published United States patent application 2008-

0111277 (incorporated herein by reference in its entirety) for further discussion and definition of a substantially proportional drawing die.

The resulting OPC (Comparative Example A) has cross sectional dimensions of approximately 2.54 cm by 0.762 cm.

Comparative Example A has a density of 0.879 grams per cubic centimeter (g/cc) while the pre-drawn billet has a density of 0.901 g/cc. Drawing resulted in a cavitated void volume corresponding to a 4% reduction in density. Neat polypropylene is known to produce a cavitated void volume sufficient to reduce density by up to 5% (see, A. Pawlak and A. Galeski, MACROMOLECULES, 38(23), pages 9688-9697 (2005)).

Comparative Example A results in an visually apparent scratch under the Scratch Test Method and a 16 centimeter length in the Fibrillation Test Method.

Comparative Example B

Prepare Comparative Example B as Comparative Example A except use a polypropylene impact copolymer with 33 wt % non-crosslinked ethylene/propylene rubber (for example, D143.00 Performance Polymer from The Dow Chemical Company).

Comparative Example B has a density of 0.893 grams per cubic centimeter (g/cc) while the pre-drawn billet has a density of 0.904 g/cc. Drawing resulted in a cavitated void volume corresponding to a 1% reduction in density.

Comparative Example B results in an visually apparent scratch under the Scratch Test Method and a 18 centimeter length in the Fibrillation Test Method.

Comparing results from Comparative Example A and Comparative Example B illustrates that use of a bound rubber component with the polypropylene in the form of an impact copolymer does not prevent the appearance of a scratch in the Scratch Test Method. Moreover, the impact copolymer OPC results in a much worse performance in the Fibrillation Test Method.

Comparative Example C

Prepare Comparative Example C like Comparative Example A except include 46 wt % talc dispersed in the polymer composition of the billet prior to drawing.

Comparative Example C has a density of 0.838 g/cc while the pre-drawn billet has a density of 1.31 g/cc. Drawing resulted in a cavitated void volume corresponding to 37% reduction in density.

Comparative Example C results in an visually apparent scratch under the Scratch Test Method and a 11 centimeter length in the Fibrillation Test Method.

Comparing results from Comparative Example A and Comparative Example C illustrates that use of a hard particulate additive in the polypropylene in the form of talc does not prevent the appearance of a scratch in the Scratch Test Method.

Comparative Example D

Prepare Comparative Example D like Comparative Example C except include 3 wt % TEGOMER™ AntiScratch 100 antiscratch slip agent (TEGOMER is a trademark of Goldschmidt GMBH) dispersed in the polymer composition of the billet prior to drawing.

Comparative Example D has a density of 0.87 g/cc while the pre-drawn billet has a density of 1.3 g/cc. Drawing resulted in a cavitated void volume corresponding to 33% reduction in density.

Comparative Example D results in an visually apparent scratch under the Scratch Test Method and a 18 centimeter length (maximum possible) in the Fibrillation Test Method.

Comparing results from Comparative Example D with those of Comparative Examples A and C reveals that use of a hard particulate additive with a slip agent in the polypropylene does not prevent the appearance of a scratch in the Scratch Test Method. Moreover, including the slip agent with the talc results in a worse performance in the Fibrillation Test.

Comparative Example E

Prepare Comparative Example E like Comparative Example C except include 3 wt % IRGASURF™ SR100 antiscratch slip agent (IRGASURF is a trademark of Ciba Specialty Chemicals Corporation) dispersed in the polymer composition of the billet prior to drawing.

Comparative Example E has a density of 0.93 g/cc while the pre-drawn billet has a density of 1.35 g/cc. Drawing resulted in a cavitated void volume corresponding to 31% reduction in density.

Comparative Example E results in an visually apparent scratch under the Scratch Test Method and a 18 centimeter length (maximum possible) in the Fibrillation Test Method.

Comparing results from Comparative Example E with those of Comparative Examples A and C reveals that use of a hard particulate additive with a slip agent in the polypropylene does not prevent the appearance of a scratch in the Scratch Test Method. Moreover, including the slip agent with the talc results in a worse performance in the Fibrillation Test.

Comparative Example F

Prepare Comparative Example F like Comparative Example C except include 46 wt % Wollastonite NYADG (available from NYCO Minerals) in place of the talc.

Comparative Example F has a density of 0.86 g/cc while the pre-drawn billet has a density of 1.3 g/cc. Drawing resulted in a cavitated void volume corresponding to 34% reduction in density.

Comparative Example F results in an visually apparent scratch under the Scratch Test Method and a 18 centimeter length (maximum possible) in the Fibrillation Test.

Comparing results from Comparative Example A and comparative Example F reveals that inclusion of Wollastonite does not prevent the appearance of a scratch in the Scratch Test Method. Moreover, including Wallastonite dramatically worsens the performance of an OPC in the Fibrillation Test.

Examples

Prepare Examples in like manner as Comparative Example A except include crosslinked rubber particles dispersed within the polymer composition billet prior to drawing. The crosslinked rubber particles are ground reclaimed whole tire rubber of various mesh sizes as available from Lehigh Technologies, LLC (Naples, Fla. USA). The crosslinked rubber particles are in a form of a free flowing black powder produced from vulcanized rubber material. Table 2 identifies the amount of crosslinked rubber particles and the mesh size of the crosslinked rubber particles for each Example, as well as characterization of each Example in terms of density and the various test procedures.

TABLE 2

| Example | Crosslinked Rubber (wt %[a]) | Rubber Size (mesh[b]) | Billet Density (g/cc) | Final Density (g/cc) | Density Reduction (%[c]) | Scratch Test Results[d] | Fibrillation Test Results (cm) |
|---|---|---|---|---|---|---|---|
| Comp A | 0 | 0 | 0.901 | 0.879 | 4 | Y | 16 |
| Comp B | 0 | 0 | 0.904 | 0.893 | 1 | Y | 18 |
| Comp C | 0 | 0 | 1.31 | 0.838 | 37 | Y | 11 |
| Comp D | 0 | 0 | 1.30 | 0.87 | 33 | Y | 18 |
| Comp E | 0 | 0 | 1.35 | 0.93 | 31 | Y | 18 |
| Comp F | 0 | 0 | 1.30 | 0.86 | 34 | Y | 18 |
| 1 | 5 | 80 | 0.918 | 0.844 | 8 | N | 15 |
| 2 | 15 | 200 | 0.876 | 0.725 | 17 | N | 18 |
| 3 | 15 | 140 | 0.922 | 0.719 | 22 | N | 16 |
| 4 | 15 | 80 | 0.893 | 0.682 | 24 | N | 18 |
| 5 | 15 | 30 | 0.897 | 0.722 | 20 | N | 18 |
| 6 | 27 | 200 | 0.942 | 0.736 | 22 | N | 18 |
| 7 | 27 | 140 | 0.937 | 0.689 | 26 | N | 17 |
| 8 | 27 | 80 | 0.944 | 0.702 | 26 | N | 14 |
| 9 | 27 | 30 | 0.983 | 0.737 | 25 | N | 5 |
| 10 | 39 | 200 | 0.949 | 0.810 | 15 | N | 12 |
| 11 | 39 | 140 | 0.975 | 0.720 | 26 | N | 12 |
| 12 | 39 | 80 | 0.984 | 0.615 | 38 | N | 10 |
| 13 | 39 | 30 | 1.01 | 0.740 | 27 | N | 6 |

[a]wt % relative to polymer weight
[b]mesh values are in standard US sieve size. Mesh value to particle size values correlate as follows: 30 mesh corresponds to particles of 595 microns or less; 80 mesh corresponds to particles of 177 microns or less; 140 mesh corresponds to particles of 105 microns or less; and 200 mesh corresponds to particles of 74 microns or less.
[c]Percent density reduction = [(billet density − final density)/billet density] * 100%
[d]Scratch Test Results are reported as either "Y" for yes a scratch is visually apparent or "N" for no a scratch is not visually apparent.

These Examples illustrate that the mere presence of crosslinked rubber particles increases the extent of cavitated void volume sufficiently to reduce the density of an OPC by over 5% relative to its pre-drawn density. Example 1, crosslinked rubber particles at a concentration of only 5 wt % resulted in an 8% reduction in density.

Moreover, these Examples illustrate the surprising result that the mere presence of crosslinked rubber in the OPC eliminates the appearance of scratches under the Scratch Test Method. In contrast, Comparative Examples D, E and F illustrate that conventional methods known for improving scratch resistance were not effective in providing scratch resistance in OPCs under the given scratch conditions. Still more surprising, Comparative Example B illustrates that merely including non-crosslinked rubber does not prevent scratching like the crosslinked rubber particles.

These Examples further illustrate an increase in resistance to fibrillation with the presence of crosslinked rubber particles and the relation of concentration and size of crosslinked rubber particles to resistance to fibrillation. The largest rubber particle size in the Examples (30 mesh, 595 microns or less in size) reveal a dramatic increase in resistance to fibrillation at a concentration of 27 wt % based on polymer weight relative to the non-filled OPC (Comparative Example A). The rubber 80 mesh particles (particle size 177 microns or less) also reveal a significant increase in resistance to fibrillation at a concentration of 27 wt % based on polymer weight. At a loading of 39 wt % relative to polymer weight all of the rubber particle sizes demonstrated an increase in resistance to fibrillation.

What is claimed is:

1. An oriented polymer composition article, comprising:
   at least one of amorphous and semi-crystalline polymer having a softening temperature and an induced orientation of polymer chains in the oriented polymer composition article; and
   crosslinked rubber particles dispersed within the oriented polymer composition article, with the crosslinked rubber particles being non-flowable at the polymer softening temperature,
   wherein the oriented polymer composition article has cavitation void volume without blowing agent.

2. The oriented polymer composition article of claim 1, wherein the oriented polymer composition article has a density of less than 1.0 gram per cubic centimeter (g/cc).

3. The oriented polymer composition article of claim 1, wherein the oriented polymer composition article is comprised of 10 wt % or more of the crosslinked rubber particles.

4. The oriented polymer composition article of claim 1, wherein the oriented polymer composition article has a flexural modulus of 1.4 gigaPascals (GPa) or greater.

5. The oriented polymer composition article of claim 1, wherein the at least one of amorphous and semi-crystalline polymer is comprised of prolylene-based polymer.

6. An oriented polymer composition article, comprising:
   orientable polymer having an induced orientation of polymer chains in the oriented polymer composition article;
   crosslinked rubber particles dispersed within the oriented polymer composition article; and
   void cavities within the oriented polymer composition article, with the void cavities being proximate to the crosslinked rubber particles,
   wherein the oriented polymer composition article has a density of less than 1.0 gram per cubic centimeter (g/cc).

7. The oriented polymer composition article of claim 6, wherein the oriented polymer composition article has a density of less than 1.0 gram per cubic centimeter (g/cc).

8. The oriented polymer composition article of claim 6, wherein the oriented polymer composition article is comprised of 10 wt % or more of the crosslinked rubber particles.

9. The oriented polymer composition article of claim 6, wherein the oriented polymer composition article has a flexural modulus of 1.4 gigaPascals (GPa) or greater.

10. The oriented polymer composition article of claim 6, wherein the void cavities are without blowing agent.

11. The oriented polymer composition article of claim 6, wherein the orientable polymer is comprised of at least one of amorphous and semi-crystalline polymer.

12. The oriented polymer composition article of claim 11, wherein the at least one of amorphous and semi-crystalline polymer is comprised of prolylene-based polymer.

13. The oriented polymer composition article of claim 6, wherein the orientable polymer has a softening temperature and the crosslinked rubber particles are non-flowable at the polymer softening temperature.

14. The oriented polymer composition article of claim 1, wherein the crosslinked rubber particles are crosslinked by reaction with a multifunctional monomer during a polymerization process, by reaction with a crosslinking agent after polymerization, or by vulcanization with sulfur.

15. The oriented polymer composition article of claim 6, wherein the crosslinked rubber particles are crosslinked by reaction with a multifunctional monomer during a polymerization process, by reaction with a crosslinking agent after polymerization, or by vulcanization with sulfur.

* * * * *